US012492811B1

(12) United States Patent
Anderson

(10) Patent No.: US 12,492,811 B1
(45) Date of Patent: Dec. 9, 2025

(54) TOOL WITH INTEGRATED LIGHT

(71) Applicant: Joseph Samuel Anderson, Mojave Valley, AZ (US)

(72) Inventor: Joseph Samuel Anderson, Mojave Valley, AZ (US)

( * ) Notice: Subject to any disclaimer, the term of this patent is extended or adjusted under 35 U.S.C. 154(b) by 0 days.

(21) Appl. No.: 19/063,703

(22) Filed: Feb. 26, 2025

Related U.S. Application Data

(60) Provisional application No. 63/562,616, filed on Mar. 7, 2024.

(51) Int. Cl.
*F21V 33/00* (2006.01)
*F21V 15/00* (2015.01)
*F21V 23/00* (2015.01)
*F21V 23/04* (2006.01)

(52) U.S. Cl.
CPC .......... *F21V 33/0084* (2013.01); *F21V 15/00* (2013.01); *F21V 23/002* (2013.01); *F21V 23/0414* (2013.01)

(58) Field of Classification Search
CPC .. F21V 33/0084; B66F 15/00; A46B 15/0036; B23B 2228/48; B23Q 17/2404; B25B 23/18; B26B 11/008; B26B 19/46; B26B 21/46
See application file for complete search history.

(56) References Cited

U.S. PATENT DOCUMENTS 1,439,404 A * 12/1922 Cotharin ................. B25B 23/18 81/437
7,735,172 B2 6/2010 Newton et al.
8,550,516 B2 10/2013 Best
9,414,669 B2 8/2016 Fleischer
10,429,058 B2 10/2019 Mckean et al.
2007/0014108 A1 1/2007 Uke
2008/0316765 A1* 12/2008 Nevin ..................... B25B 23/18 81/439
2009/0116227 A1* 5/2009 Lin ..................... F21V 33/0084 362/120
2009/0154145 A1* 6/2009 Nevin ..................... B25B 15/02 362/119
2012/0227197 A1 9/2012 Fleischer
2022/0090775 A1 3/2022 Streen et al.

FOREIGN PATENT DOCUMENTS

| | | | | |
|---|---|---|---|---|
| CN | 107468025 A | * | 12/2017 | ................ F21S 9/02 |
| CN | 109588941 A | * | 4/2019 | ............. A47G 25/02 |
| KR | 20210085088 A | * | 7/2021 | .......... F21V 33/0084 |

* cited by examiner

*Primary Examiner* — Alexander K Garlen

(74) *Attorney, Agent, or Firm* — Master Key IP, LLP; Jeromye V. Sartain

(57) ABSTRACT

A tool apparatus for use in and selective illumination of a working area, the apparatus having a head defining a working end of the apparatus, the head having a head body and at least one leg extending distally from the head body and configured for functional use, the head body having a distally-opening head bore, a handle, a shaft interconnecting the head at a distal end of the shaft and the handle at an opposite proximal end of the shaft, and a light operably installed in the head so as to be coaxial with the shaft and to selectively illuminate the working area beyond the head, the light comprising a housing positioned within the head bore and a light source projecting distally from the housing.

20 Claims, 4 Drawing Sheets

TOOL WITH INTEGRATED LIGHT

RELATED APPLICATIONS

This non-provisional patent application claims priority pursuant to 35 U.S.C. § 119(e) to and is entitled to the filing date of U.S. Provisional Patent Application Ser. No. 63/562,616 filed Mar. 7, 2024, and entitled "Tool with Integrated Light." The contents of the aforementioned application are incorporated herein by reference.

BACKGROUND

The subject of this patent application relates generally to tools, and more particularly to tools configured with an integrated light.

The following description includes information that may be useful in understanding the present invention. It is not an admission that any of the information provided herein is prior art or relevant to the presently claimed invention, or that any publication specifically or implicitly referenced is prior art.

Applicant hereby incorporates herein by reference any and all patents and published patent applications cited or referred to in this application, to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

By way of background, in the course of firefighting, firefighters frequently find themselves on dark and/or smokey roofs and in dark and/or smoke-filled rooms, and when they have a "trash hook" in their hands, as is typically used to pull "trash" (e.g., wet drywall, roofing material, wood, etc.) out of the way while performing firefighting duties and also to "sound" the roof by pounding the backside of the hooks on the roof to determine if it is "sound" enough to walk on, the only source of light is a passive chest mounted light that only shines light in the direction that the firefighter's torso is facing. Since two hands are required to use a trash hook and other such tools like an axe or pry bar, firefighters are often left "blind" or with limited vision as to what they are walking on or where the tool is being directed. With the large number of hazards (e.g., live wires, holes in roofs and floors, and loose overhead debris, etc.) a source of directed light that doesn't require the firefighter to let go of the tool in his or her hands and is directed toward the working area is desperately needed. And it will be appreciated that while the described and illustrated exemplary tool with integrated light is such a firefighting tool commonly referred to as a "trash hook," the invention is not so limited but may take a number of other forms or be incorporated into a number of other tools without departing from its spirit and scope.

Aspects of the present invention fulfill these needs and provide further related advantages as described in the following summary.

SUMMARY

Aspects of the present invention teach certain benefits in construction and use which give rise to the exemplary advantages described below.

The present invention solves the problems described above by providing a new and novel tool with integrated light. In at least one embodiment, a light is incorporated into the end of an otherwise typical trash hook to illuminate the path and working areas of firefighters to not only enable them to see so they can work more efficiently, but also allow them to see so they can work more safely and so reduce injuries and even deaths.

Other objects, features, and advantages of aspects of the present invention will become more apparent from the following detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings.

Figure 1:
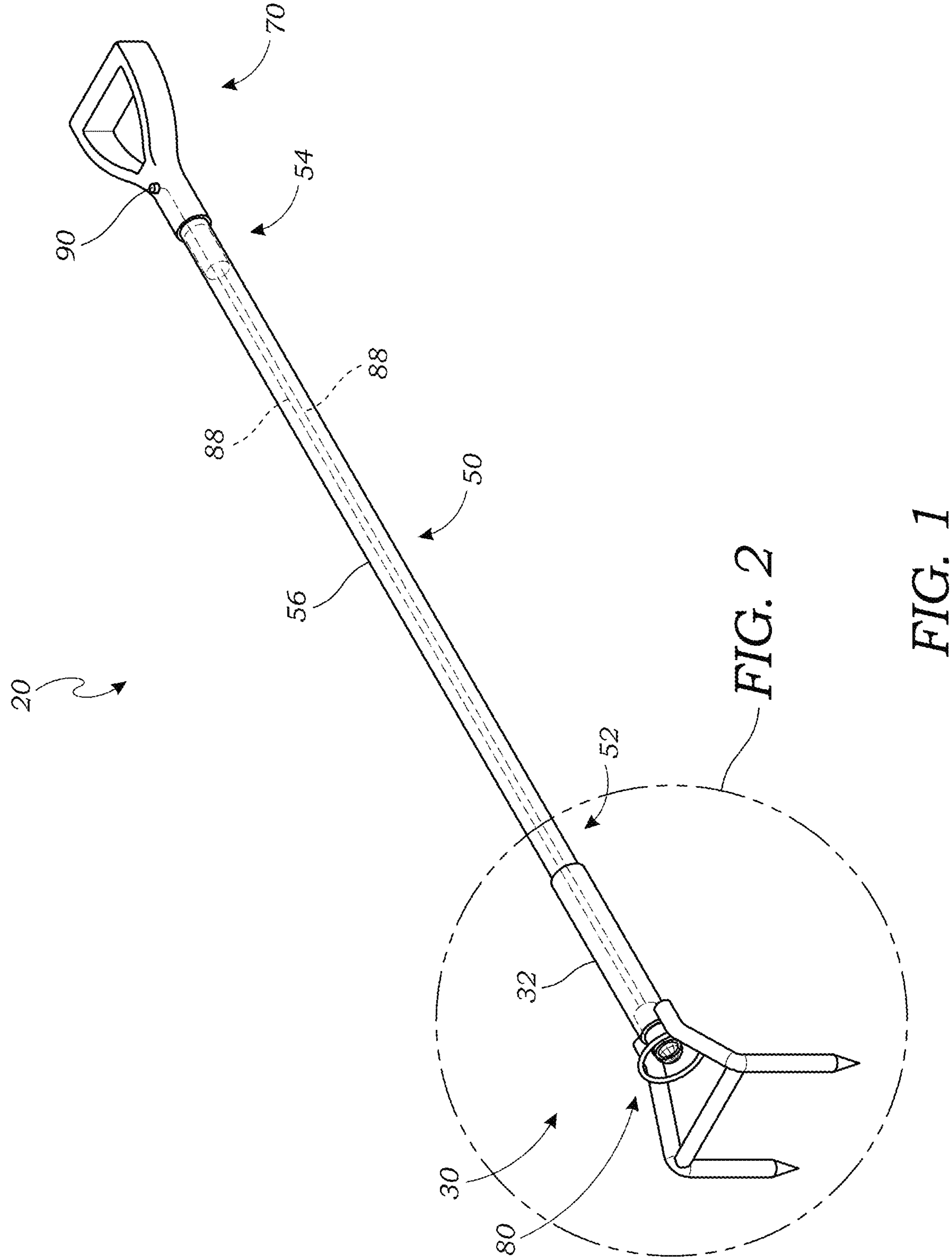
FIG. 1 is a perspective view of an exemplary tool apparatus, in accordance with at least one embodiment.

The above described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments. More generally, those skilled in the art will appreciate that the drawings are schematic in nature and are not to be taken literally or to scale in terms of material configurations, sizes, thicknesses, and other attributes of an apparatus according to aspects of the present invention and its components or features unless specifically set forth herein.

DETAILED DESCRIPTION

The following discussion provides many exemplary embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

While the inventive subject matter is susceptible of various modifications and alternative embodiments, certain illustrated embodiments thereof are shown in the drawings and will be described below in detail. It should be understood, however, that there is no intention to limit the invention to any specific form disclosed, but on the contrary, the inventive subject matter is to cover all modifications, alternative embodiments, and equivalents falling within the scope of any appended claims.

Turning now to FIG. 1, there is shown a perspective view of an exemplary embodiment of a tool apparatus 20 according to aspects of the present invention. The apparatus 20 comprises, in the exemplary embodiment, a distal head 30, an opposite proximal handle 70, and an intermediate lengthwise shaft 50, with a light 80 incorporated within the tool apparatus 20 and particularly the head 30, though with additional components of the light 80 in at least one exemplary embodiment passing or positioned within the shaft 50 and/or the handle 70 as described further below. Once again, those skilled in the art will appreciate that while the exemplary embodiment of such a tool apparatus 20 according to aspects of the present invention is configured as a firefighting "trash hook," the invention is not so limited but may be incorporated into a variety of other tools of various trades, including but not limited to shovels, axes, pitchforks, etc., such that unless indicated otherwise or an inventive feature is disclosed as being particular to such a "trash hook" type tool, the invention may take a variety of other forms without departing from its spirit and scope, on which basis it will be appreciated that while the exemplary embodiment "trash hook" tool apparatus 20 has a head 30 comprising a pair of opposed legs 40 as particularly shown and described in connection with FIG. 2, the invention is not so limited and thus the head 30 with its body 32 (sometimes referred to as a "collar") and its at least one leg 40 may have a variety of configurations, with such one or more leg 40 taking the form of a fork, an axe blade, a shovel blade, or the like. As such, in the general sense, leg 40 is to be more broadly understood than the particular shape and arrangement of the spaced-apart legs 40 of the exemplary "trash hook" head 30.

Continuing with the exemplary embodiment of a tool apparatus 20 according to aspects of the present invention as shown in FIG. 1 and now also the enlarged perspective view of the head 30 of the tool 20 as shown in FIG. 2, while again the working or distal end or head 30 of the tool 20 is configured as a "trash hook," the head 30 is unique in that it is particularly adapted to accept the light 80, which light 80 could be either removable (e.g., cartridge or flashlight type) or permanently incorporated into the head 30 or specifically the body 32 thereof, such that it is to be expressly understood that "integrated" encompasses the light 80 being either permanently or removably installed in the tool 20, in whole or in part. In addition to the light 80 adaptation, more about which is said below, other features of the exemplary tool head 30 will stand out as unique; for example, existing trash hooks have a sharp corner on the proximal end or edge of the body 32 (where the pole or shaft 50 engages the head 30), which sharp corner and flat face or shoulder often gets snagged when retracting or pulling the hook tool 20 back through a wall, roof, or ceiling, while in the tool 20 according to aspects of the present invention the head 30 will incorporate a chamfer on the proximally-facing end or edge of the body 32 that is less than forty five degrees (45°) for a relatively smoother transition and to reduce snagging upon tool 20 retraction. The opposite legs 40 of the "trash hook" type head 30 as either formed or cast integrally with the body 32 or formed separately and installed on the body 32 as by welding are then further stabilized for sounding or otherwise as by having a crossbar 42 formed or installed, again such as by welding, as spanning between the legs 40 as between the bent or "knee" portions thereof as shown. The head 30, including the body 32 and legs 40 and any related features, may be formed from any appropriate manufacturing and/or assembly process now known or later developed and is preferably made from a non-ferrous material to save weight while potentially being heat treated in a secondary finishing operation to increase strength and reduce stress. The tool body 32 may also have features for installation of the light 80 or features such as holes or recesses to access a switch or to mount or incorporate a switch into or onto the body 32, though in the preferred embodiments shown herein any such switch 90 is instead positioned proximal of the tool head 30 in either the proximal end 54 of the shaft 50 or in the handle 70, again, more about which is said below in discussing the light 80 and its various operational components. The head body 32 is also shown as having a head bore 34 for receiving the distal end 52 of the shaft 50 when assembling the head 30 onto the shaft 50; those skilled in the art will appreciate that such assembly may employ any appropriate materials or methods now known or later developed, including but not limited to bolts, screws, pins, collapsing wedge mounts, crimping, bonding, etc. By way of further illustration and not limitation, the hollow pole or shaft 50 of the tool 20 is preferably formed of a non-conductive material such as fiberglass and is bonded with the body 32 employing a heat-resistant adhesive such as epoxy. A traditional mounting would have the hollow head body 32 or "collar" configured as the "female" and the pole or shaft 50 as the "male," as shown, such that the interior surface of the head body 32 or the head bore 34 is secured onto the exterior or outer surface 56 of the shaft 50, though it will be appreciated that the tool head 30 or body 32 could instead be configured to slide into the inner bore 58 of the shaft 50 such that the mounting surfaces are reversed. Once more, those skilled in the art will appreciate that a variety of such configurations or aspects of a tool apparatus 20 according to aspects of the present invention are possible without departing from its spirit and scope.

Figure 2:
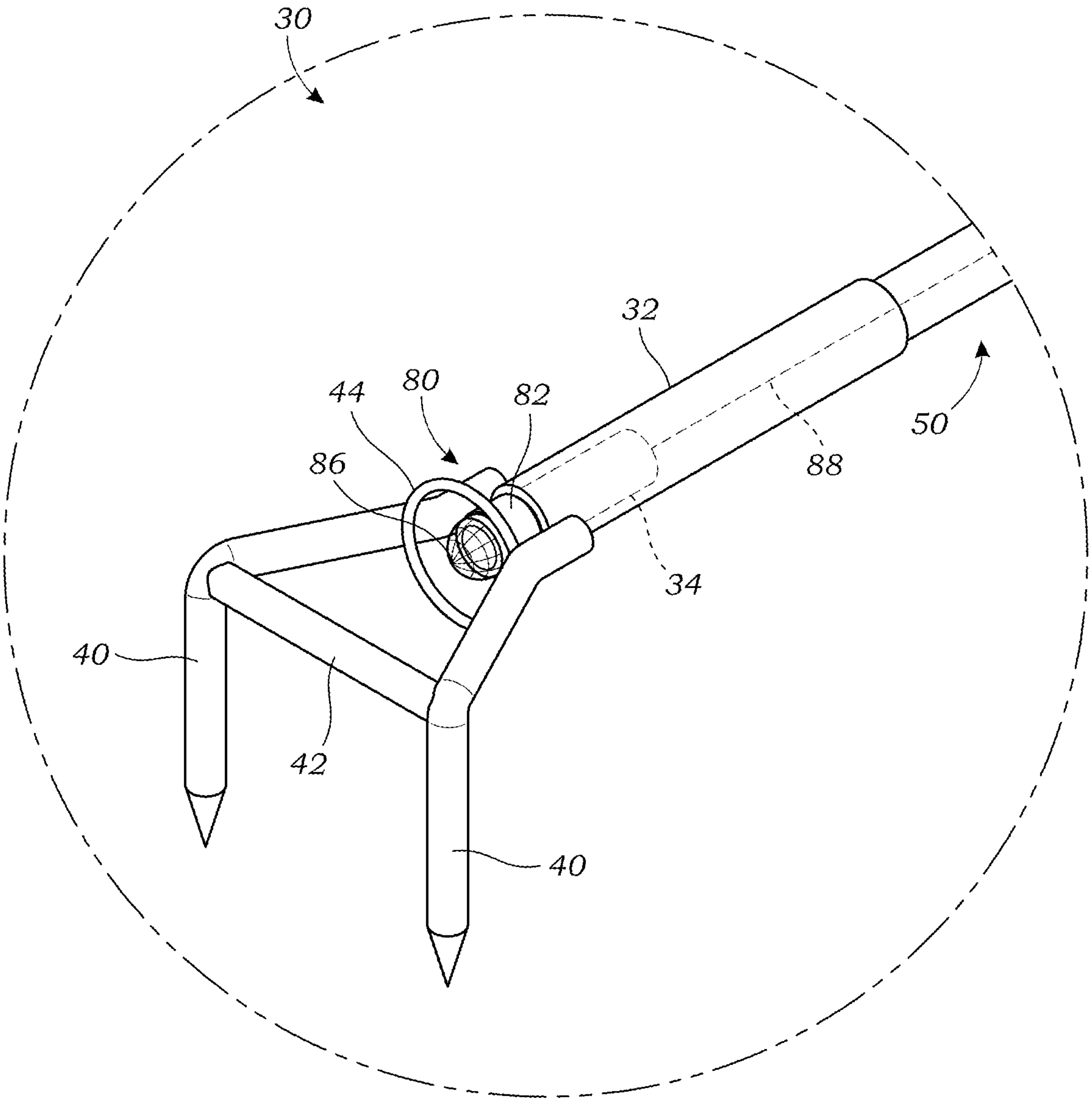
FIG. 2 is an enlarged partial perspective view of the head thereof taken from circle "FIG. 2" of FIG. 1, in accordance with at least one embodiment.
Figure 3A:
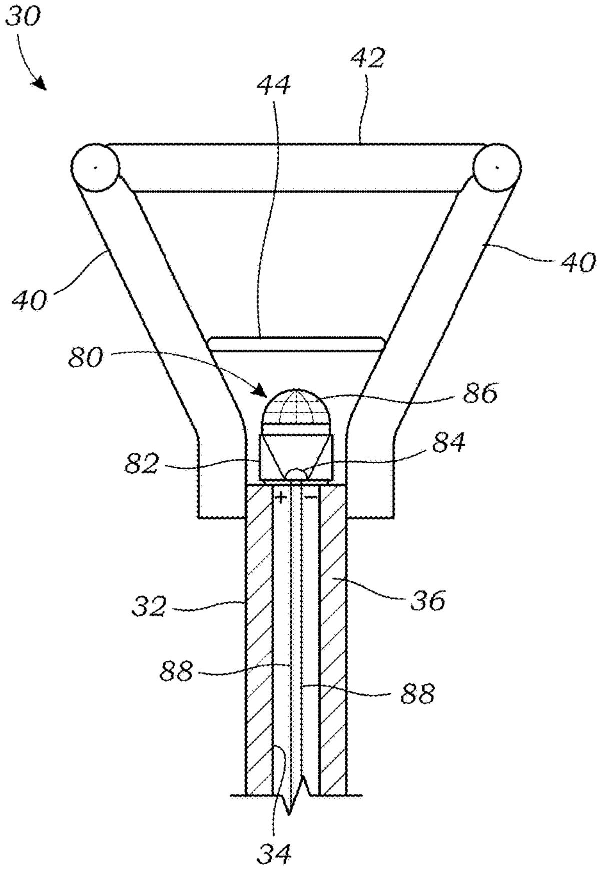
FIG. 3A is an enlarged partial and partially sectioned bottom view of the head thereof, in accordance with at least one embodiment.
Figure 3B:
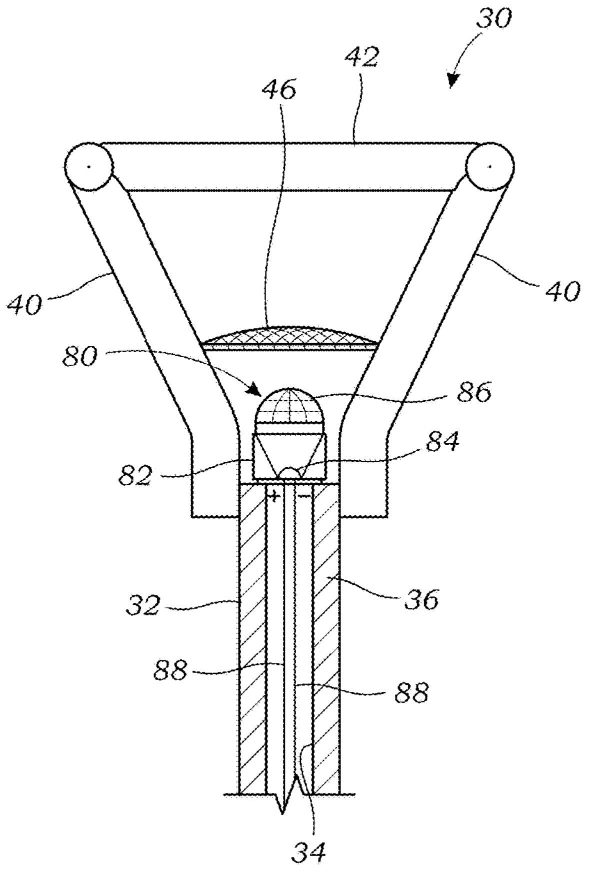
FIG. 3B is an enlarged partial and partially sectioned bottom view of an alternative head thereof, in accordance with at least one embodiment.

As best seen in FIG. 2 and also FIGS. 3A and 3B, the head 30 and specifically the body 32 also has features to capture or retain the light 80 and to protect the light 80, which is susceptible to damage in the harsh environment in which the tool 20 is often used. Once again, the light housing 82 is received within the distal end of the internal bore 34 of the tool head body 32, which may be a permanent or removable installation involving any appropriate components or methods now known or later developed, including but not limited to threads, grooves, holes, or detents. The housing 82 may protrude partially from the head bore 34 as shown or may be more fully seated therein. Either way, at least the distally- or outwardly-facing light cover 86 would be somewhat exposed to impact and possible damage, and thus the light source 84 therebeneath, such as an LED and driver, since, by design, the light 80 is located axially within the tool 20 and specifically axially along the tool head 30, more particularly the body 32 and thus the shaft 50, and is positioned between the legs 40 of the head 30 so as to direct light distally in the direction the tool 20 is being used. In a further exemplary embodiment, the light assembly 80 would include a glass lens in a semi-spherical shape on the exposed end outside of the assembly, as, in addition to, or instead of the noted cover 86, and/or a further semi-spherical internal glass lens within the assembly 20 adjacent the LED or light source 84 itself to provide the correct or preferred projection of light distally from the light assembly 80 beyond the tool head 30 and toward the working area, such lens or lens-type cover 86 thereby providing optical characteristics to the light 80. Notably, then, as shown in FIGS. 2 and 3A, a ring 44 may be formed as part of the head 30 so as to span between opposite legs 40 spaced from the light 80 and so providing a further physical or mechanical barrier or defense against anything impacting the light 80 and specifically any exposed portion of the housing 82 or cover 86. Alternatively, as shown in FIG. 3B, a metal screen or mesh 46 may be provided on the head 30 again spanning between opposite legs 40 spaced from the light 80 so as to again protect the light 80 from direct impact during use of the tool 20. The ring 44, mesh 46, or any other such protective structure, alone or in combination, may again be formed integrally with the head 30 including its body 32 and legs 40 or may be formed separately in one or more components and steps and subsequently installed on the head 30 using any appropriate assembly technique now known or later developed, including but not limited to welding, and whether before or after any heat treat secondary operation, though preferably before. And the lens or cover 86 of the light assembly 80 may be made from any suitable heat-resistant material now known or later developed, including but not limited to glass, which material it will be appreciated would not only withstand the heat and harsh environment in which such a tool 20 as a "trash hook" may be employed but during use can then be cleaned or wiped off using a gloved hand or otherwise, such as if fire embers, burnt materials, products of combustion, roofing material, ceiling material, or other types of debris associated with firefighting operations become stuck to or are covering the light assembly 80 and specifically the lens or cover 86 thereof. The body itself 32 may be formed from or have applied or coated thereon a heat-resistant insulative material 36, in whole or in part, to protect the light 80 and specifically its internal components such as the light source 84 and wires 88 from the heat of the environment the tool 20 may be used in. A related insulating sheath (not shown) may be provided within either or both of the body bore 34 and the shaft inner bore 58 to protect any wires 88 running the length of the tool from the head 30 to the handle 70 down the shaft 50 from both heat and moisture. Externally, the tool head 30 will preferably make use of non-conductive coatings such as ceramic to reduce the possibility of electrocution and arc flash; current trash hooks are typically painted and, while the fiberglass pole reduces the possibility of electrocution, the paint offers little protection from arc flash. Rather than the typical black color trash hook, selected so that the tool does not look as dirty and dingy after use but renders the tool head harder to see during use, bright, reflective, polished finishes will allow the tool 20 and specifically its distal or working end or head 30 to be seen while in use, and if the proper finish and finishing techniques are used will also make the tool easier to clean. Optionally, "glow-in-the-dark" coatings or decals may be attached to the tool 20 for better visibility in lowlight conditions.

Figure 4A:
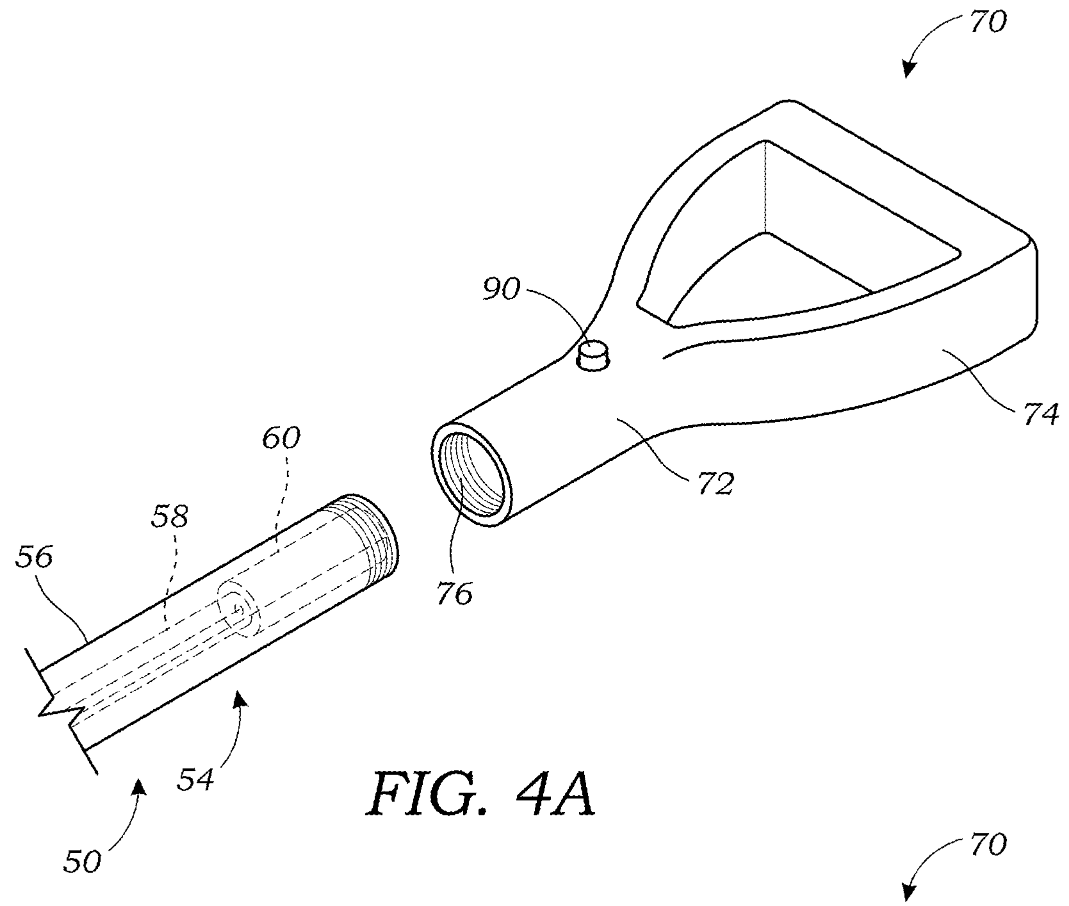
FIG. 4A is an enlarged partial and partially exploded perspective view of the handle and shaft thereof, in accordance with at least one embodiment.
Figure 4B:
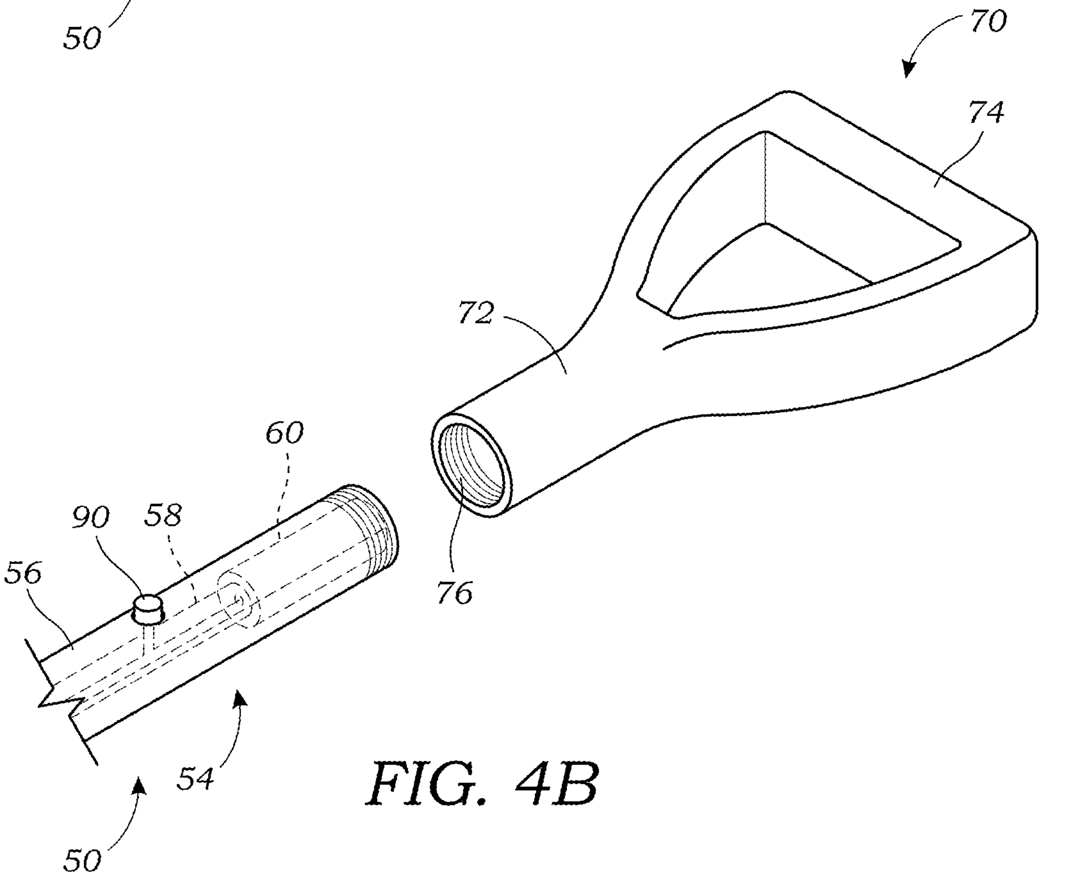
FIG. 4B is an enlarged partial and partially exploded perspective view of an alternative handle and shaft thereof, in accordance with at least one embodiment.

With continued reference to FIG. 1 and now also FIGS. 4A and 4B, the proximal end of the tool apparatus 20 according to aspects of the present invention generally comprises a handle 70 with grip 74 installed on the proximal end 54 of the shaft 50, which may again be a male-female or female-male engagement employing any appropriate assembly technique now known or later developed, including but not limited to threads as shown, as by having a male thread on the proximal end 54 of the shaft 50 and a female thread formed within the distally-opening receiver 76 within the body 72 of the handle 70, or by bolts, screws, pins, collapsing wedge mounts, crimping, bonding, etc. Regardless, in the exemplary embodiment, the battery (not shown) and switch 90 and other electrical components (not shown) are located in the proximal portion of the tool 20, again, whether on or in the proximal end 54 of the pole or shaft 50 or on or in the handle 70, though it will be appreciated by those skilled in the art that the battery(ies) and other electronics can be located anywhere appropriate on or in the tool 20 according to aspects of the present invention. Specifically, as shown, the shaft inner bore 58 is formed proximally having a battery well 60 for removable receipt therein of one or more batteries as required to power the light 80, with wires 88 passing from any electronics components, and specifically any battery(ies) in the battery well 60 and other heat-shielded or heat-resistant wiring harness (not shown) connected to the battery(ies), at the proximal end 54 of the shaft 50 to the distal end 52 of the shaft 50 through the shaft bore 58 and then to the light assembly 80 installed within the head 30 as herein described so as to selectively power the light 80. It will be appreciated that any battery(ies) within the battery well 60 may also be protected by any insulative properties of the shaft 50 and battery well 60 specifically and may be accessed such as for removal and/or replacement, for example, as by simply unscrewing or otherwise removing the handle 70 from the shaft 50 to expose the battery well 60. Regarding selectively powering the light 80 (e.g., turning the light on and off, changing its mode such as frequency, brightness, or color, etc.), at least one switch 90 may be provided as part of the tool 20 and the light assembly 80 specifically. In an exemplary embodiment, the switch 90 is again either located at the handle 70 such as in the handle body 72 as shown in FIG. 4A or in the handle grip 74 or located at the proximal end 54 of the tool shaft 50 as shown in FIG. 4B, though again, such switch 90 may be in other locations beyond those shown and described without departing from the spirit and scope of the invention, in any case at the very least providing for electronic connection consisting of a simple on/off switch circuit with a positive connection to the positive terminal on the battery and a negative connection at the switch pot or grounding location as appropriate. This simple circuit could also be integrated into a more complex "on/off" multiple button or electronic circuit, particularly if an "A/C current detection system" is incorporated into the tool head 30 as by employing the ring 44 or other protection component on or around the lighting assembly 80 as a "wand" or other means of detecting A/C current, with such circuit or electronics then even optionally comprising an audible or visual alert or alarm device, which circuit could share a battery and switch with the light 80 or have separate battery(ies) and switch(es) or any combination thereof. Moreover, the switch 90 may be wired or wireless employing any components and methods now known or later developed in the art. By way of illustration and not limitation, the switch 90 may be remote and in this version the light 80 may have a plug (not shown) or other feature to connect the light 80 to the switch 90. If the light 80 is mounted in a way which allows the bezel of the light housing 82 to protrude from the body 32, the switch 90 may be light-mounted, and so, for example, a twist switch could be used and the light 80 could then be turned on and off by twisting the light's bezel. A bezel-mounted push button or slide switch could also be used. If an exposed bezel light 80 were to be used, once again, a protective device such as the illustrated ring 44 or mesh 46 may be incorporated to protect the directly exposed light 80 from being damaged during use of the tool 20.

In closing, regarding the exemplary embodiments of the present invention as shown and described herein, it will be appreciated that a tool with integrated light is disclosed and configured for use in harsh and even hot environments and allowing for light to be emitted in the direction of tool use while protecting the light from damage. Because the principles of the invention may be practiced in a number of configurations beyond those shown and described, it is to be understood that the invention is not in any way limited by the exemplary embodiments and is generally able to take numerous forms without departing from the spirit and scope of the invention. It will also be appreciated by those skilled in the art that the present invention is not limited to the particular geometries and materials of construction disclosed, but may instead entail other functionally comparable structures or materials, now known or later developed, without departing from the spirit and scope of the invention.

Certain embodiments of the present invention are described herein, including the best mode known to the inventor(s) for carrying out the invention. Of course, variations on these described embodiments will become apparent to those of ordinary skill in the art upon reading the foregoing description. The inventor(s) expect skilled artisans to employ such variations as appropriate, and the inventor(s) intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

In some embodiments, the numbers expressing quantities of components or ingredients, properties such as dimensions, weight, concentration, reaction conditions, and so forth, used to describe and claim certain embodiments of the inventive subject matter are to be understood as being modified in some instances by terms such as “about,” “approximately,” or “roughly.” Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the inventive subject matter are approximations, the numerical values set forth in any specific examples are reported as precisely as practicable. The numerical values presented in some embodiments of the inventive subject matter may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. The recitation of numerical ranges of values herein is merely intended to serve as a shorthand method of referring individually to each separate value falling within the range. Unless otherwise indicated herein, each individual value of a numerical range is incorporated into the specification as if it were individually recited herein. Similarly, all lists of values should be considered as inclusive of intermediate values unless the context indicates the contrary.

Use of the terms “may” or “can” in reference to an embodiment or aspect of an embodiment also carries with it the alternative meaning of “may not” or “cannot.” As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term “optionally” in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

The terms “a,” “an,” “the” and similar references used in the context of describing the present invention (especially in the context of the following claims) are to be construed to cover both the singular and the plural, unless otherwise indicated herein or clearly contradicted by context. Further, ordinal indicators—such as “first,” “second,” “third,” etc.—for identified elements are used to distinguish between the elements, and do not indicate or imply a required or limited number of such elements, and do not indicate a particular position or order of such elements unless otherwise specifically stated.

All methods described herein can be performed in any suitable order unless otherwise indicated herein or otherwise clearly contradicted by context. The use of any and all examples, or exemplary language (e.g., “such as”) provided with respect to certain embodiments herein is intended merely to better illuminate the inventive subject matter and does not pose a limitation on the scope of the inventive subject matter otherwise claimed. No language in the application should be construed as indicating any non-claimed element essential to the practice of the invention.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms “comprises” and “comprising” should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While aspects of the invention have been described with reference to at least one exemplary embodiment, it is to be clearly understood by those skilled in the art that the invention is not limited thereto. Rather, the scope of the invention is to be interpreted only in conjunction with any appended claims here or in any patent application claiming the benefit hereof, and it is made clear that the inventor believes that the claimed subject matter is the invention.

What is claimed is:

1. A tool apparatus for use in and selective illumination of a working area, the apparatus comprising:

a head defining a working end of the apparatus, the head having a head body and two spaced apart legs extending distally from opposite sides of the head body and configured for functional use, the head body having a distally-opening head bore;

a handle;

a shaft interconnecting the head at a distal end of the shaft and the handle at an opposite proximal end of the shaft;

a light operably installed in the head so as to be coaxial with the shaft and to selectively illuminate the working area beyond the head, the light comprising a housing positioned within the head bore and a light source projecting distally from the housing; and one or more of a ring, a mesh, and a crossbar formed within the head spaced from the light as spanning between the spaced-apart legs to protect the light source.

2. The apparatus of claim 1 wherein the light source projects distally between the spaced-apart legs.

3. The apparatus of claim 2 wherein a ring is formed within the head spaced from the light as spanning between the spaced-apart legs to protect the light source.

4. The apparatus of claim 2 wherein a mesh is formed within the head spaced from the light as spanning between the spaced-apart legs to protect the light source.

5. The apparatus of claim 2 wherein a crossbar is formed within the head spaced from the light as spanning between the spaced-apart legs to protect the light source and provide further strength to the head.

6. The apparatus of claim 1 wherein the light further comprises a switch for selectively powering the light source.

7. The apparatus of claim 6 wherein the switch is operably installed in one of the handle or the proximal end of the shaft and is electrically connected to the light source through wires running through an inner bore of the shaft.

8. The apparatus of claim 7 wherein the shaft inner bore is formed proximally having a battery well for removable receipt therein of one or more batteries as required to power the light, the wires connecting the switch and any battery at the proximal end of the shaft to the light source within the head at the distal end of the shaft so as to selectively power the light.

9. The apparatus of claim 8 wherein the battery well is accessible through selective removal of the handle from the shaft to expose the battery well.

10. The apparatus of claim 7 wherein the head body comprises a heat-resistant insulative material to protect the light source and the wires.

11. The apparatus of claim 1 wherein the light further comprises a heat-resistant cover positioned distally over the light source.

12. The apparatus of claim 11 wherein the cover defines a lens having optical characteristics.

13. The apparatus of claim 1 wherein the light is selectively removable from the head as by removing the housing from the head bore.

14. The apparatus of claim 1 wherein the head body is outwardly chamfered proximally.

15. The apparatus of claim 1 wherein the head comprises a non-conductive coating.

16. The apparatus of claim 1 wherein the head is configured for electrical current detection.

17. The apparatus of claim 1 wherein the handle comprises a handle body and a grip.

18. The apparatus of claim 17 wherein the handle body has a distally-opening receiver for selective engagement with the proximal end of the shaft.

19. The apparatus of claim 1 wherein the shaft is formed of a non-conductive material.

20. A tool apparatus for use in and selective illumination of a working area, the apparatus comprising:

a head defining a working end of the apparatus, the head having a head body and two spaced-apart legs extending distally from opposite sides of the head body and configured for functional use, the head body having a distally-opening head bore;

a handle;

a shaft interconnecting the head at a distal end of the shaft and the handle at an opposite proximal end of the shaft;

a light operably installed in the head so as to be coaxial with the shaft and to selectively illuminate the working area beyond the head, the light comprising a housing positioned within the head bore, a light source projecting distally from the housing between the spaced-apart legs, a heat-resistant cover positioned distally over the light source, and a switch for selectively powering the light source, the switch operably installed in one of the handle or the proximal end of the shaft and electrically connected to the light source through wires running through an inner bore of the shaft; and one or more of a ring, a mesh, and a crossbar formed within the head spaced from the light as spanning between the spaced-apart legs to protect the light source.

* * * * *